United States Patent
Sone et al.

(10) Patent No.: US 8,463,135 B2
(45) Date of Patent: Jun. 11, 2013

(54) RELAY APPARATUS, SIGNAL PROCESSING APPARATUS AND OPTICAL COMMUNICATION SYSTEM

(75) Inventors: Kyosuke Sone, Kawasaki (JP); Yutaka Kai, Kawasaki (JP); George Ishikawa, Kawasaki (JP); Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 12/754,178

(22) Filed: Apr. 5, 2010

(65) Prior Publication Data
US 2010/0266293 A1 Oct. 21, 2010

(30) Foreign Application Priority Data
Apr. 15, 2009 (JP) ................................ 2009-099197

(51) Int. Cl.
H04B 10/00 (2006.01)
(52) U.S. Cl.
USPC ............. 398/173; 398/175; 398/177; 398/97; 398/98
(58) Field of Classification Search
USPC ............. 398/173, 181, 175, 177, 180, 97–99, 398/75, 47
See application file for complete search history.

(56) References Cited

U.S. PATENT DOCUMENTS

| | | | |
|---|---|---|---|
| 5,861,969 A * | 1/1999 | Yasuda | 398/176 |
| 6,031,645 A * | 2/2000 | Ichikawa | 398/41 |
| 6,208,444 B1 * | 3/2001 | Wong et al. | 398/9 |
| 7,295,783 B2 * | 11/2007 | Singh et al. | 398/175 |
| 7,369,771 B2 * | 5/2008 | Lee et al. | 398/72 |
| 7,738,163 B2 * | 6/2010 | Bidmead et al. | 359/334 |
| 7,853,146 B2 * | 12/2010 | Takakuwa et al. | 398/53 |
| 8,139,950 B2 * | 3/2012 | Niibe et al. | 398/168 |
| 8,238,753 B2 * | 8/2012 | Hamano et al. | 398/100 |

(Continued)

FOREIGN PATENT DOCUMENTS

| | | |
|---|---|---|
| JP | 2002-141927 | 5/2002 |
| JP | 2008-17264 | 1/2008 |
| JP | 2009-77323 | 4/2009 |
| WO | 2008/072347 A1 | 6/2008 |

OTHER PUBLICATIONS

N. Nadarajah et al., "10 Gb/s upgrade for High-Split and Long-Reach PON Using Remote Repeater", 2008 OECC/ACOFT, Jul. 2008 2 pp.
Japanese Notice of Reason for Refusal mailed Feb. 12, 2013, in corresponding Japanese Patent Application No. 2009-099197.

Primary Examiner — Daniel Washburn
Assistant Examiner — Hibret Woldekidan
(74) Attorney, Agent, or Firm — Staas & Halsey LLP

(57) ABSTRACT

A relay apparatus including: a first interface 11 that branches an optical signal that is input in a first direction from one side of the optical transmission line, and directs the optical signal to a first path and a second path, the first path being a processing path of an optical signal having a first transmission speed, the second path being a processing path of an optical signal having a second transmission speed that is different from the first transmission speed; a processing section 12 that executes processing on an optical signal propagating through each of the paths in accordance with a corresponding transmission speed; and a second interface 13 that binds the first path and the second path of the optical signal on which the processing is executed by the processing section, by means of wavelength multiplexing and directs to the other end of the optical transmission line.

12 Claims, 10 Drawing Sheets

U.S. PATENT DOCUMENTS

| | | |
|---|---|---|
| 8,265,485 B2 * | 9/2012 | Nakamura et al. .............. 398/97 |
| 2005/0041975 A1 * | 2/2005 | Nakamura et al. .............. 398/85 |
| 2008/0050116 A1 * | 2/2008 | Nakaishi et al. ................ 398/43 |
| 2009/0080888 A1 | 3/2009 | Sugawara et al. |
| 2010/0067913 A1 * | 3/2010 | Niibe et al. ..................... 398/98 |
| 2011/0116803 A1 * | 5/2011 | Sone et al. ...................... 398/98 |
| 2011/0311221 A1 * | 12/2011 | Mukai et al. .................... 398/25 |

* cited by examiner

RELAY APPARATUS, SIGNAL PROCESSING APPARATUS AND OPTICAL COMMUNICATION SYSTEM

CROSS-REFERENCE TO RELATED APPLICATION

This application is based upon and claims the benefit of priority of the prior Japanese Patent Application No. 2009-099197, filed on Apr. 15, 2009, the entire contents of which are incorporated herein by reference.

FIELD

The present case relates to a relay apparatus, a signal processing apparatus, and an optical transmission system which are applied to a passive optical network (PON), for example.

BACKGROUND

Recently, as optical access systems, optical communication systems have been adapted as a mainstream which has a transmission capacity of 1 Gbps class (hereinafter, "Gbps" may be simply referred to by "G") which accommodates a plurality of subscribers in the passive double star configuration, such as the gigabit Ethernet-PON (GE-PON), the gigabit capable-PON (G-PON).

As next-generational PON systems, adapting communication systems having a transmission capacity of a 10 G have been studied for increasing the communication speed. In addition, for the strategy to extend service ranges, increasing the length and the number of branches by adding repeaters (relay apparatuses) has been studied.

In developing such PON systems, network systems that allow coexistence of systems having different transmission speeds is expected for transitioning to a system in which the transmission speed is increased in a more economical and efficient manner. Such systems include, a system in which a 1-G system and a 10-G system coexist. Even in such a network system, it can be assumed that repeaters are used in order to increase transmission distance.

PRIOR ART REFERENCES

Patent Documents

Patent Document 1: Japanese Laid-open Patent Publication No. 2008-17264
Patent Document 2: Japanese Laid-open Patent Publication No. 2002-141927

In developing repeaters that can support a network system which allows systems having different transmission speeds to coexist, such as the 1-/10-G hybrid system as set forth previously, 1-G signals and 10-G signals can not be processed in the common manner easily, which may be an issue.

For example, 1-G signals having a wider waveband are difficult to be amplified whereas 10-G signals having a narrower waveband can be amplified using a conventional optical amplifier. Accordingly, optical amplification using a common optical amplifier is not easy.

In addition, processing by means of regenerator that executes a conventional optical/electrical conversion (O/E conversion) or electrical/optical conversion (E/O conversion) can be performed on 1-G signals, rather than amplification processing using optical amplifiers for 10-G signals. In contrast, processing by means of a regenerator on 10-G signals requires enhancement of functions of modules used for the processing, which incurs cost increase. The techniques disclosed in the above-described Patent Documents 1 and 2 cannot provide any solution to the above-described issues.

SUMMARY (1) According to an aspect of the embodiments, a relay apparatus interposed in an optical transmission line through which different types of optical signals are transmitted in two opposite directions, the optical signals having different transmission speeds for each direction, the relay apparatus including: a first interface that branches an optical signal that is inputted in a first direction from one side of the optical transmission line, and directs the optical signal to a first path and a second path, the first path being a processing path of an optical signal having a the first transmission speed, the second path being a processing path of an optical signal having a the second transmission speed that is different from the first transmission speed; a processing section that executes processing on an optical signal in the first direction propagating through each of the paths in accordance with a corresponding transmission speed; and a second interface that binds the first path and the second path, which are propagation paths of the optical signal on which the processing is executed by the processing section, by means of wavelength multiplexing and directs to the other end of the optical transmission line may be employed.

(2) In addition, a signal processing apparatus that processes optical signals including an optical signal at the first transmission speed and an optical signal at a the second transmission speed coexisting on a time axis, including: a first processing section that executes processing corresponding to the optical signal at the first transmission speed on one of branched signals of the coexisting optical signals; a second processing section that executes processing corresponding to the optical signal at the second transmission speed on another of the branched signals of the coexisting optical signals in accordance with the optical signal at the second transmission speed, wherein the second processing section outputs a result of the processing when an input of another of the branched signals is detected while stopping the output of the result of the processing when the input is not detected, and preferentially stops the output of the result of the processing when processing corresponding to the optical signal at the first transmission speed is executed by the first processing section may be employed.

(3) In addition, an optical communication system, including the relay apparatus of the above (1) interposed in an optical transmission line may be employed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereunder, embodiments of the present invention will be described with reference to the drawings. The embodiments that will be described are merely exemplary, and it is not intended to exclude various variations and applications of techniques that are not described. In other words, the embodiments can be practiced in various modifications without departing from the spirit thereof.

(A) First Embodiment

Figure 1:
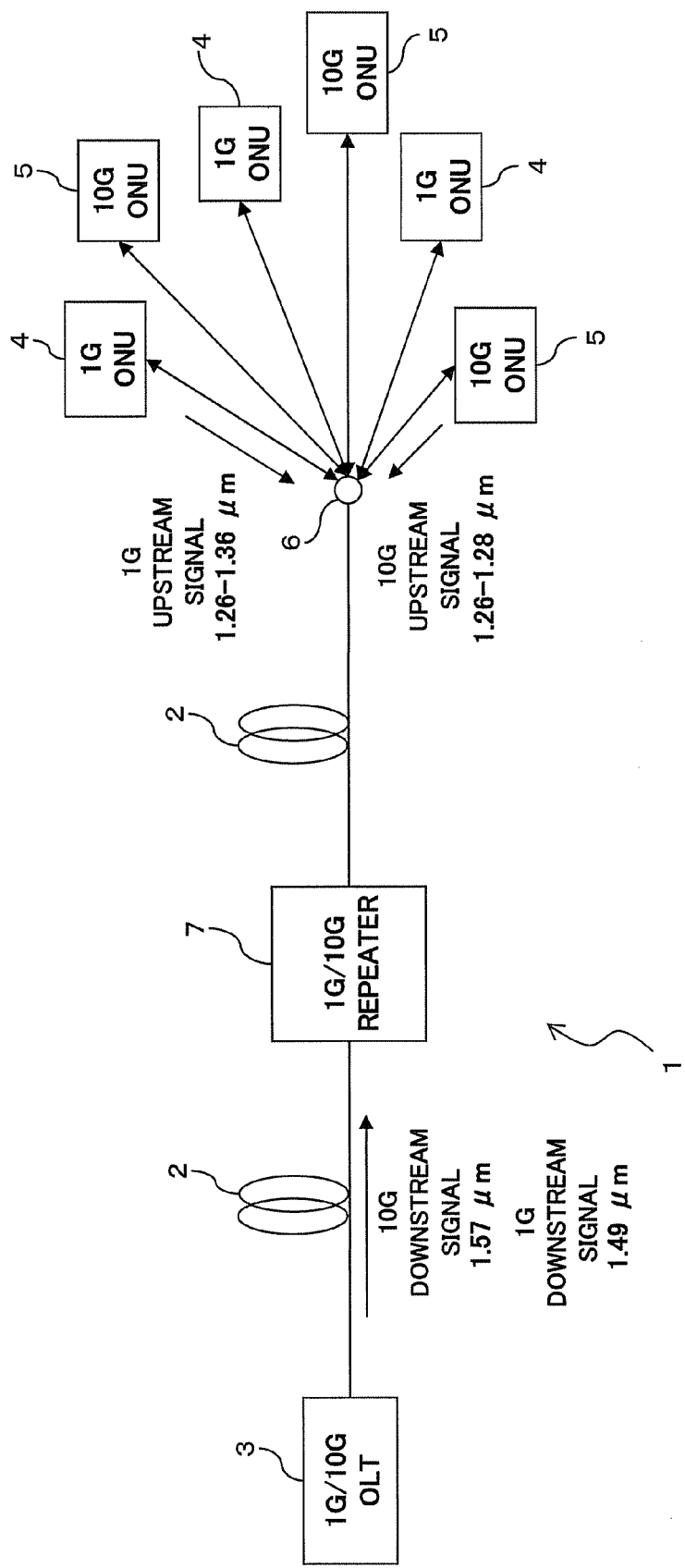
FIG. 1 is a diagram illustrating the configuration of a network system having optical transmission lines through which optical signals having different transmission speeds are transmitted.

FIG. 1 is a diagram illustrating the configuration of a network system (optical communication system) 1 having an optical transmission line 2 through which optical signals having different transmission speeds (for example, at 1 G and at 10 G) are transmitted. In the network system 1 illustrated in FIG. 1, an optical line terminal (OLT) 3, and a plurality of optical network units (ONUs) 4 and 5 carry out communication by means of optical signals.

Here, the OLT 3 adapts standards that are commonly used for transmission speeds of 1 G and 10 G. Additionally, the ONUs 4 adapt a standard for processing signals having a transmission speed of 1 G, and the ONUs 5 adapt a standard for processing signals having a transmission speed of 10 G. The optical transmission line 2 has a star network topology, and connects the OLT 3 and each of the ONUs 4 and 5 via an optical splitter 6 and a repeater (relay apparatus) 7.

Although the optical splitter 6, to which the ONUs 4 and 5 are connected, is connected to the optical transmission line 2 on the opposite side (i.e., downstream side) of the OLT 3 with respect to the repeater 7 in FIG. 1, it maybe connected to the optical transmission line 2 on the side of the OLT 3 (i.e., upstream side) with respect to the repeater 7. Additionally, the optical splitter 6 that may be connected to the optical transmission lines 2 upstream and downstream of the repeater 7 may be provided.

Figure 2:
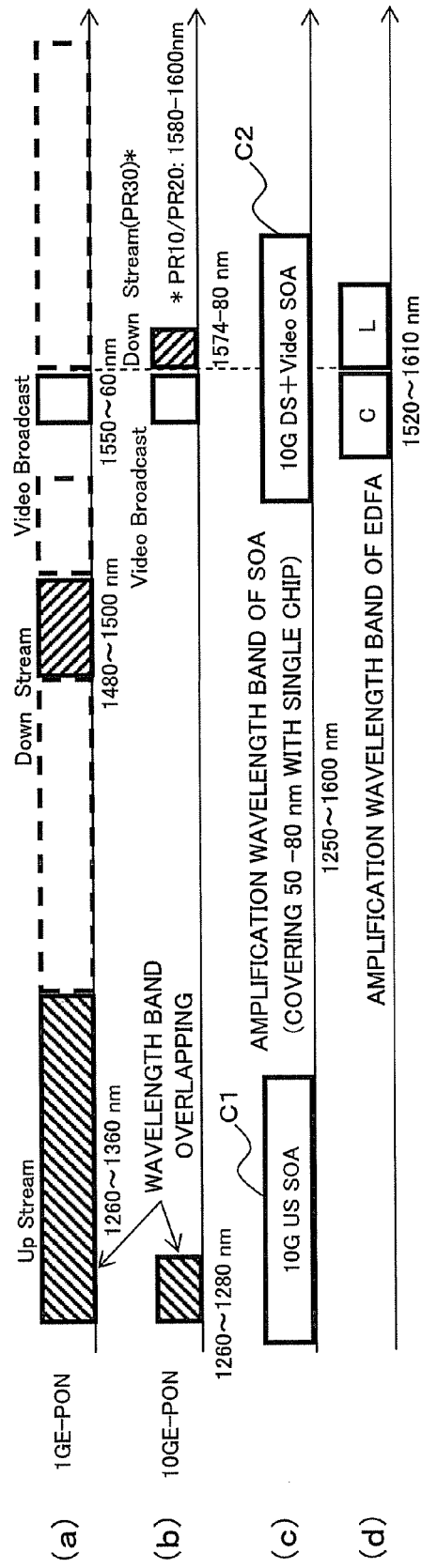
FIGS. 2a and 2b are diagrams illustrating operational wavebands of the E-PON.
FIGS. 2c and 2d are diagrams illustrating amplification wavebands in accordance with optical amplifiers.

Here, the 1-G E-PON may be adapted as the transmission scheme for the OLT 3 and the ONUs 4. In such a case, as depicted in FIG. 2a, the wavelength of 1-G downstream signals (optical signals in the direction from the OLT 3 to the ONUs 4) is 1480-1500 nm. Additionally, the wavelength of 1-G upstream signals (optical signals in the direction from the ONUs 4 to the OLT 3) is 1260-1360 nm.

Furthermore, the 10-G E-PON may be adapted as the transmission scheme for the OLT 3 and the ONUs 5. In such a case, as depicted in FIG. 2b, the wavelength of 10-G downstream signals is 1574-1580 nm, and the wavelength of 10-G upstream signals is 1260-1280 nm. Accordingly, the waveband of 10-G upstream signals overlaps that of 1-G upstream signals. It is noted that the G-PON or other transmission schemes, for example, may be used as the transmission scheme between the OLT 3 and the ONUs 4 and 5.

The OLT 3 allocates times (time slots) that are available for transmitting optical signal in the upstream direction to each of the ONUs 4 and 5 by taking the difference in transmission time due to the transmission distances with each of the ONUs 4 and 5. In this manner, the OLT 3 carries out communication by means of the time-division multiplexing or time division multiple access.

In other words, since the wavebands of 1-G and 10-G optical signals, especially those in the upstream direction overlap, the OLT 3 makes a distinction between 1-G upstream optical signals and 10-G upstream optical signals with allocations of time slots, rather than differentiating them on optical wavelength basis.

Figure 3:
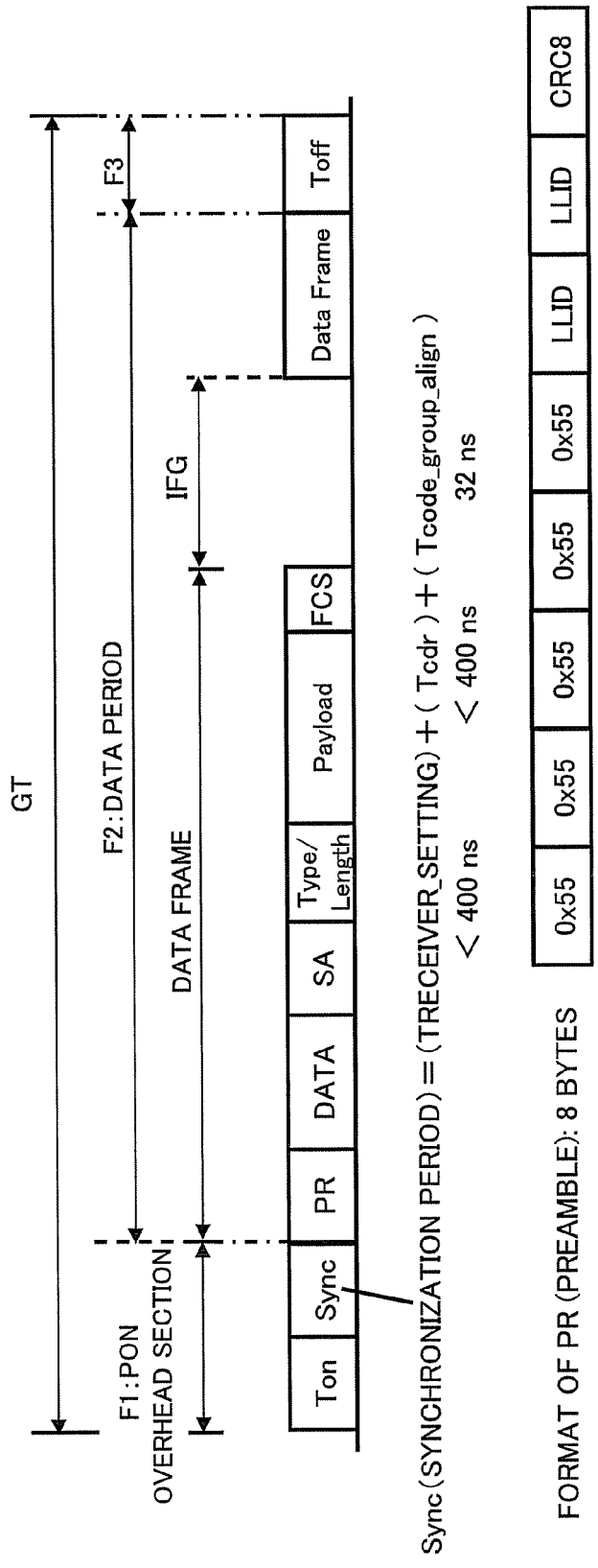
FIG. 3 is a diagram illustrating the format within a time slot of the E-PON.

FIG. 3 is a diagram illustrating the format of a single time slot allocated to a 1-G ONU 4 when the E-PON is adapted. Time slot corresponding to grant times (GT) as depicted in FIG. 3 are aligned on the time axis for each of the ONUs 4 and 5 under the control of the OLT 3.

Here, as illustrated in FIG. 3 in a single grant time GT for an ONU 4, a PON overhead section F1 is arranged at the beginning, followed by a data period F2, and an extinction period F3 (Toff) is located at the end. The PON overhead section F1 has a rising time Ton of the optical signal and a synchronization period Sync.

The synchronization period is a period for establishing frame synchronization for an inputted signal. For example, the synchronization period is the period in which the OLT 3 or the repeater 7 establishes frame synchronization for upstream signals. The synchronization period includes Treceiver_setting, and Tcdr and Tcode_group_align.

Here, Treceiver_setting is an adjustment period for received light waveform level, Tcdr is a bit synchronization period for extracting a received block from received data, and Tcode_group_align is a byte synchronization period of the received data. Note that the above-described Treceiver_setting and Tcdr are shorter than 400 ns, and Tcode_group align can be set to about 32 ns.

In addition, in the data period, data frames are arranged having an inter frame gap (IFG) interposed therebetween. The data frames include a PR, a destination address (DA), a source address (SA), a Type/Length, a Peyload, and a frame check sequence (FCS), arranged in this order from the beginning of the time axis. Here, the PR represents a preamble period, the DA and the SA are periods indicating the destination address and the sender address. Furthermore, the Type/Length is a period indicating the data attribute and the data length, the Peyload is a period for the main signal, and FCS is a period indicating information for an error correction.

Note that the PR has the format having a 5-byte alternating code, followed by a 2-byte LLID and an 8-bit cyclic redundancy check (CRC8), as depicted in FIG. 3. It is noted that "0x55" in FIG. 3 represents an alternating code in a hexadecimal notation, a binary notation thereof being "01010101."

An ONU 4 or 5 send an optical signal having the above frame structure at timing allocated by a time slot, and the sent optical signal is received by the OLT 3.

As described above, the OLT 3 makes a distinction between optical signals of the ONUs 4 and 5 having different transmission speeds by means of communication using time slots allocated to each of the ONUs 4 and 5, and identifies a sending ONU 4 or 5. It is noted that optical signals of the ONUs 4 and 5 may be differentiated using the wavebands in case of allocation in which wavebands do not overlap each other, as in the case of downstream signals.

The repeater 7 depicted in FIG. 1 is used to increase the transmission distance of the network system, and executes relay processing on an optical signal in the upstream direction (first direction) and in the downstream direction (second direction) in accordance with the transmission speed of the optical signal. Such relay processing includes processing that amplifies an optical signal propagating through the optical transmission line 2 to an expected level.

When a standard as described above, such as the E-PON, is applied to the OLT 3 and the ONUs 4 and 5, the wavebands of upstream signals at 1 G and at 10 G overlap. In such a case, it is desirable that a 1-/10-G hybrid system disable optical amplification processing for 10-G optical signals during the time period when a 1-G signal is propagating. It is also desirable that the output level be controlled (ALC: Automatic Level Control) to a target value in response to a burst signal for an appropriate relay processing for a 10-G optical signal.

Figure 4:
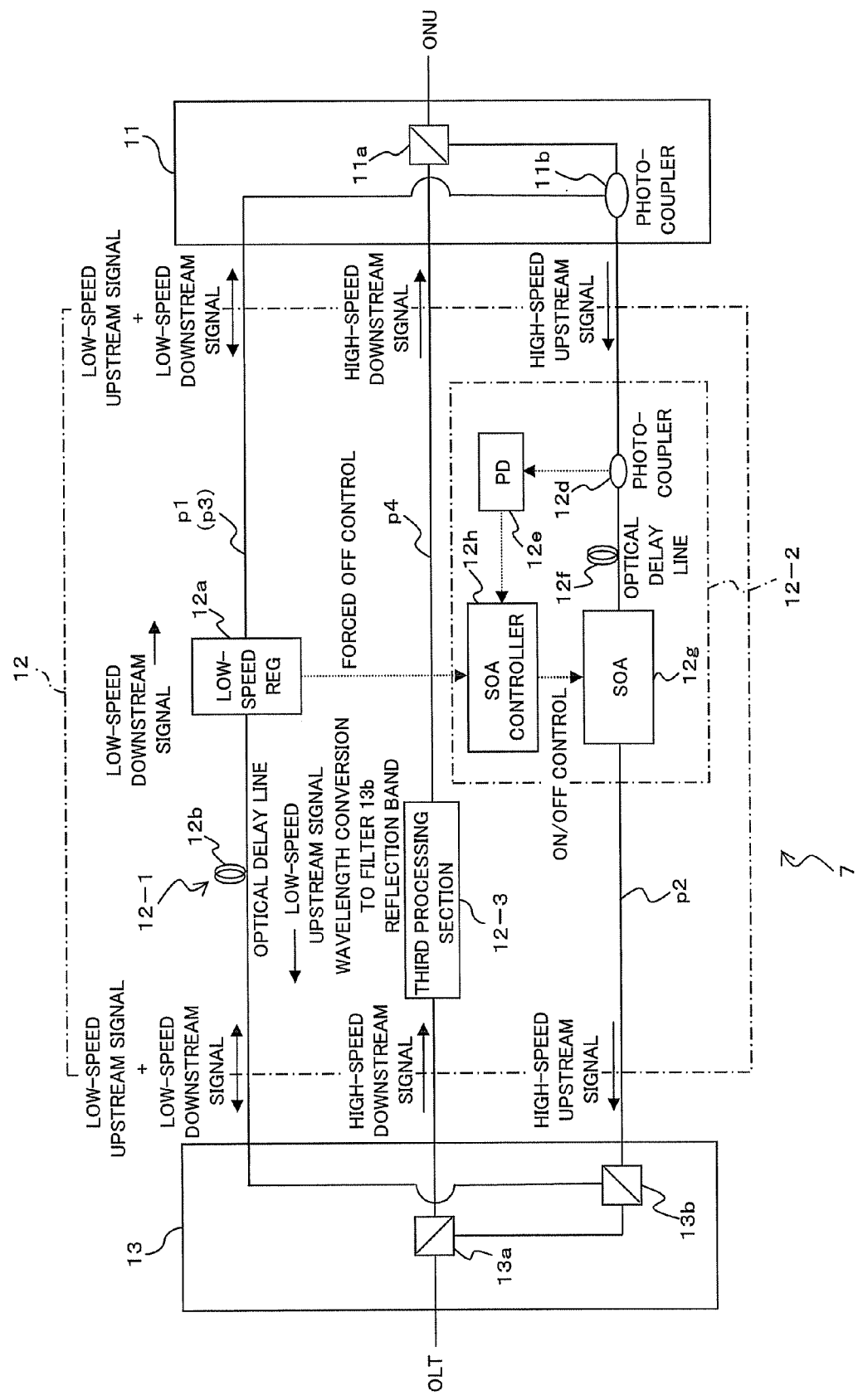
FIG. 4 is a diagram illustrating a repeater (relay apparatus) of a first embodiment.

For the above reason, in the first embodiment, a repeater (relay apparatus) 7 having the configuration as depicted in FIG. 4 is introduced. More specifically, in the repeater 7, for processing on 1-G upstream and downstream optical signals having a relatively broad waveband as depicted in FIG. 2a, signal regeneration processing is executed by way of processing at the electric signal stage. On the other hand, for 10-G downstream optical signals having their waveband not overlapping other signal wavebands, amplification (optical amplification) is performed directly on the optical signals without signal processing at the electric stage. It is noted that, although a transmission speed of 1 G corresponds to "low-speed" and a transmission speed of 10 G corresponds to "high-speed" in FIG. 4, it is intended that the labels of "low-speed" and "high-speed" merely represent relative difference between the two transmission speeds, and other transmission speeds are not excluded.

For this reason, the repeater 7 includes, as illustrated in FIG. 4, a first interface 11, a processing section 12, and second interface 13. The first interface 11 is connected to the optical transmission line 2 on the side of the ONUs 4 and 5 (i.e., downstream side), and the second interface 13 is connected to the optical transmission line 2 on the side of the OLT 3 (i.e., upstream side).

When focusing on an optical signal in the upstream direction in the first direction, the first interface 11 splits an optical signal inputted in the upstream direction (first direction) from the downstream side of the optical transmission line 2, and directs the split optical signals to a first path p1 and a second path p2. Here, the first path p1 is the processing path for optical signals at a first transmission speed (for example, 1 Gbps), and the second path p2 is the processing path for optical signals in second transmission speed (for example, 10 Gbps) that is different from the first transmission speed.

The processing section 12 executes processing on optical signals propagating through each of the paths p1 and p2 in the upstream direction according to the corresponding transmission speed. Specifically, the processing section 12 executes relay processing on upstream optical signals inputted through each of the first and second paths p1 and p2 from the first interface 11 according to the transmission speeds of optical signals allocated to each time slot.

Furthermore, the second interface 13 binds, by means of wavelength multiplexing, the first path p1 and the second path p2 that are propagation paths of the optical signals on which the processing is performed by the processing section 12, and directs to the optical transmission line 2 on the side of the OLT 3 that is the opposite direction. In this manner, the repeater 7 can relay optical signals in the upstream direction.

In addition, when focusing on optical signals in the downstream direction that is the second direction, the second interface 12 receives an optical signal from the optical transmission line 2, and directs the optical signal to a third path p3 and a fourth path p4 that are set for each waveband. For example, in the E-PON, optical signal paths are split according to the transmission speed by switching the inputted optical signals to output paths for each wavelength since a waveband of a downstream optical signal at the first transmission speed (1 Gbps) is different from that of a downstream optical signal at the second transmission speed (10 Gbps). It is noted that the path p1 is used for the third path p3 common to the above-described first path in the upstream direction in the first embodiment.

The processing section 12 executes relay processing on optical signals propagating through the above-described third and fourth paths p3 and p4 in the downstream direction according to the corresponding transmission speed. Furthermore, the first interface 11 binds the third path p3 and the fourth path p4 that are paths of the downstream direction optical signals on which the processing is executed by the processing section 12, and directs it to the optical transmission line 2. In this manner, the repeater 7 can relay optical signals in the downstream direction.

Here, the first interface 11 includes a first transmission/reflection filter (filter #1) 11a and a photocoupler 11b. To the first transmission/reflection filter 11a, the optical transmission line 2 and the fourth path p4 are connected in the transmission route, and the optical transmission line 2, and the shared first or third path p1 (p3) and the second path p2 are connected in the reflection route. Additionally, the photocoupler 11b binds or splits between the above-described shared first or third path p1, p3 and the second path p2, and the reflection route of the transmission/reflection filter 11a.

Figure 5:
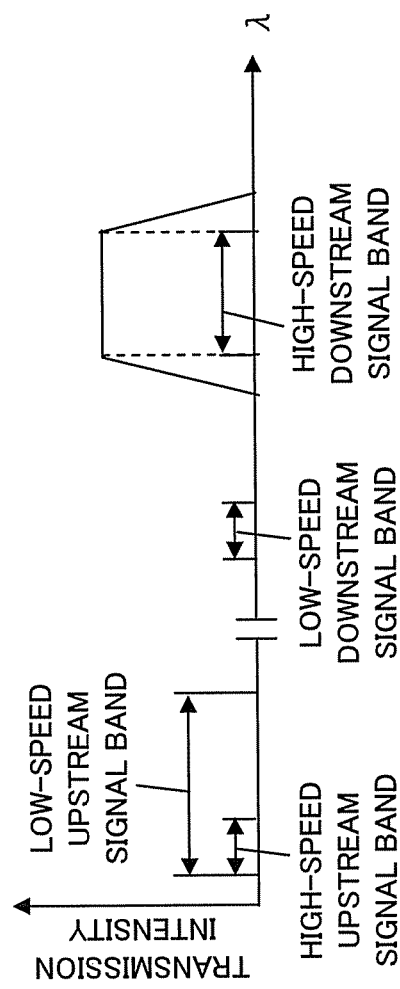
FIG. 5 is a diagram illustrating the property of a first and second transmission/reflection filters.

FIG. 5 is a diagram illustrating the wavelength transmission/reflection properties of the above-described first transmission/reflection filter 11a. As depicted in FIG. 5, the first transmission/reflection filter 11a has the property to transmit light in a waveband corresponding to 10-G (second transmission speed) downstream optical signals. In contrast, the first transmission/reflection filter 11a has the property to reflect light in other wavebands, i.e., 1-G upstream and downstream optical signals and 10-G upstream optical signals.

Thereby, optical signals from the ONUs 4 and 5 inputted through the optical transmission line 2 are directed to the first and second paths p1 and p2, respectively since they are reflected by the first transmission/reflection filter 11a and split at the photocoupler 11b.

In addition, a 10-G downstream optical signal is inputted to the first interface 11 from the fourth path p4 through the processing section 12, and the downstream optical signal is directed to the optical transmission line 2 on the downstream side since it transmits through the first transmission/reflection filter 11a. Furthermore, a 1-G downstream optical signal is inputted from the third path p3 (p1) through the processing section 12, and the downstream optical signal is directed to the optical transmission line 2 on the downstream side since it is reflected by the first transmission/reflection filter 11a through photocoupler 11b.

In addition, as depicted in FIG. 4, the second interface 13 includes a second transmission/reflection filter (filter #1) 13a and a third transmission/reflection filter (filter #2) 13b. The second transmission/reflection filter 13a connects the optical transmission line 2 and the fourth path p4 in the transmission route, and connects the optical transmission line 2 and the third transmission/reflection filter 13b in the reflection route.

The third transmission/reflection filter 13b is connected to the reflection route on the optical transmission line 2 of the second transmission/reflection filter 13a. In the third transmission/reflection filter 13b, the second transmission/reflection filter 13a and the upstream downstream shared first and third paths p1 and p3 are connected via the reflection route. Furthermore, the second transmission/reflection filter 13a and the second path p4 are connected via the transmission route.

Figure 6:
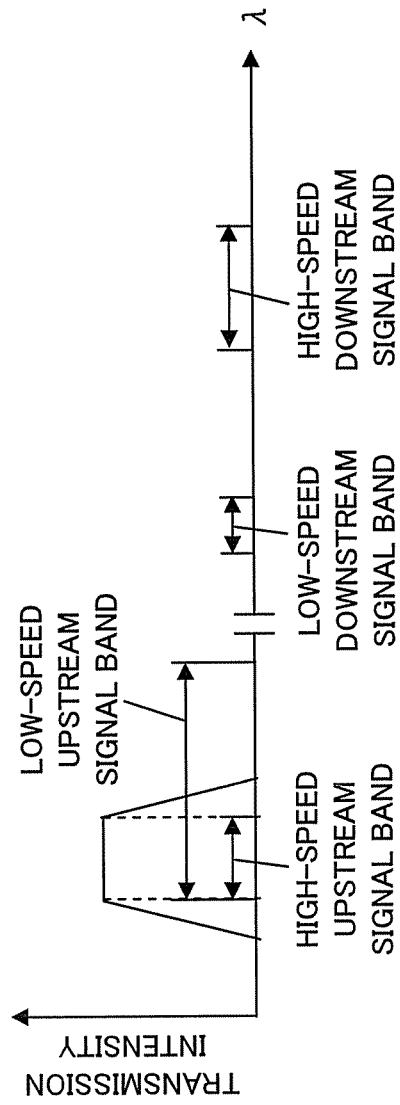
FIG. 6 is, a diagram illustrating the property of a third transmission/reflection filter.

The second transmission/reflection filter 13a may have a wavelength transmission property that is similar to the above-described case in FIG. 5, in other words, the wavelength transmission property of the first transmission/reflection filter 11a. Furthermore, the third transmission/reflection filter 13b has the wavelength transmission property as depicted in FIG. 6.

More specifically, the third transmission/reflection filter 13b has the property to transmit light in a waveband corresponding to 10 Gbps (second transmission speed) upstream optical signals. On the other hand, the third transmission/reflection filter 13b has the property to reflect light in the other wavebands, that is, optical signals except for a part of wavebands of 1 Gbps upstream optical signals (i.e., the waveband overlapped with 10-G upstream optical signals), the wavebands of 1 Gbps downstream optical signals and 10 Gbps downstream optical signal.

Thereby, for optical signals from the OLT 3 inputted through the optical transmission line 2, 10-G optical signals are transmitted through the second transmission/reflection filter 13a of the second interface 13 and directed to the fourth optical path p4 whereas 1-G optical signals are reflected. The third transmission/reflection filter 13b then further reflects the 1-G downstream optical signals reflected by the second transmission/reflection filter 13a and directs to the third path p3 (p1).

In addition, to the second interface 13, 1-G upstream optical signals are inputted through the first path p1 from the processing section 12 and 10-G upstream signal are inputted through the second path p2 from the processing section 12.

In this case, the 1-G upstream optical signals are reflected by the third transmission/reflection filter 13b and the second transmission/reflection filter 13a, and are sent to the optical transmission line 2. This is because the 1-G upstream optical signals are wavelength-converted by the processing section 12 that will be described later such that all components are reflected by the third transmission/reflection filter 13b. On the other hand, the 10-G upstream optical signals transmit through the third transmission/reflection filter 13b and reflected by the second transmission/reflection filter 13a, and are sent to the optical transmission line 2.

In addition, the processing section 12 executes relay processing on the upstream optical signals inputted from the first interface 11 according to the transmission speeds of the optical signals allocated to each time slot, sends the resulting processed optical signals through the second interface 13 to the optical transmission line 2. Similarly, the processing section 12 executes relay processing on the upstream optical signals inputted from the second interface 13 according to the transmission speeds of the optical signals allocated to each time slot, sends the resulting processed optical signals through the first interface 11 to the optical transmission line 2. For this purpose, the processing section 12 includes the first through third processing sections 12-1 to 12-3.

The first processing section 12-1 executes relay processing corresponding to 1-G optical signals on the optical signals from the first interface 11 on the first path p1 having the upstream direction. More specifically, the 10-G optical signals, together with the 1-G optical signals are inputted to the first processing section 12-1. However, since the first processing section 12-1 executes regeneration processing on 1-G signals by means of electric stage processing, the regeneration processing blocks 10-G equivalent optical signals outputted, thereby outputting 1-G equivalent optical signals.

For example, the first processing section 12-1 includes a regenerator (REG) 12a that executes signal regeneration processing accompanied by synchronization processing on 1-G equivalent signals, and an optical delay line 12b. The processing of the regenerator 12a includes synchronization processing, such as extraction of 1-G block signals on the basis of the Sync (see FIG. 3) in a time slot allocated to a 1-G ONU 4.

The regenerator 12a does not execute regeneration processing on 10-G signals in a time slot allocated to a 10-G ONU 5, and does not extract its block signal. More specifically, the regenerator 12a cannot read an LLID in the preamble PR at least in a time slot allocated to a 10-G optical signal. For this reason, any processing for a time slot of a 1-G signal is not executed at this time, and an optical signal that undergoes the signal regeneration processing is not output.

Furthermore, the regenerator 12a converts the 1-G optical signals inputted from the first path so that the waveband of the inputted optical signals are narrowed down by means of E/O conversion processing after the electric stage processing. Specifically, the 1-G optical signals are wavelength-converted by the third transmission/reflection filter 13b and the second transmission/reflection filter 13a in the second interface 13 such that all components of the 1-G upstream optical signals are reflected and directed to the second transmission/reflection filter 13a.

For example, the second transmission/reflection filter 13a has a property to reflect all bands of the waveband (for example, 1.26-1.36 µm) of the light inputted as a 1-G upstream optical signal. In contrast, the third transmission/reflection filter 13b transmits light in a waveband of 1.26-1.28 µm which is the waveband of 10-G upstream optical signals.

For this purpose, the regenerator 12a converts the waveband (for example, 1.26-1.36 µm) of the light inputted as a 1-G upstream optical signal to an optical signal in a waveband of 1.29-1.36 µm which corresponds to the reflection waveband of the third transmission/reflection filter 13b. Thereby, a 1-G upstream optical signal is sent to the optical transmission line 2 on the side of the OLT 3 through the third and second transmission/reflection filters 13b and 13a.

That is, the wavelength conversion by the regenerator 12a can prevent the waveband of a 1-G upstream signal and the waveband of a 10-G upstream signal from being overlapped. Thus, an optical filter 13b may be used as the joining point of 1-G and 10-G upstream signals instead of a photocoupler, thereby suppressing the loss, and the optical filter 13b can function as a cut filter for extra ASE component of a semiconductor optical amplifier (SOA) 12g that is a component in the second processing section 12-2. In addition, since the SOA 12g is disabled in the absence of optical input, overlap of an ASE generated by the SOA 12g to an upstream signal is prevented when an ONU is provided in the upstream of the repeater 7.

In addition, regenerator (regeneration processing section) 12a executes signal regeneration processing on optical signals having the downstream direction from the first path p1 and the shared third path p3. Of inputted downstream optical signals, the above-described second interface 13 directs optical signals having a transmission speed of 1G to the third path p3, and optical signal shaving a transmission speed of 10 G to the fourth path p4. Accordingly, the first processing section 12a can execute signal regeneration processing on 1-G optical signals in the downstream direction.

Furthermore, the optical delay line (first delay section) 12b disposed in the first processing section 12-1 delays optical signals propagating through the first path p1 (the third path p3). Thereby, the propagation time of an optical signal propagating through the first path p1 between the first and second interface 11 and 13 is aligned with the propagation time of an optical signal propagating through the second path p2 between the first and second interfaces 11 and 13.

In addition, the second processing section 12-2 executes, optical signals on the second path p2 having the upstream direction (first direction), processing corresponding to optical signals at 10-G that is the second transmission speed. As depicted in FIG. 6, the first embodiment includes a photocoupler 12d, a photodiode 12e, an optical delay line (second delay section) 12f, an SOA 12g, and an SOA controller 12h.

The photocoupler 12d directs a part of optical signals (signals having both 1-G optical signals and 10-G optical signals) inputted through from the first interface 11 through the second path p2 to the photodiode 12e, and directs the remaining signals to the optical delay line 12f.

The photodiode (detector) 12e uses a photodiode that can detect an optical input from the photocoupler 12d, and has a response speed that can detect optical signal levels for each time slot period, for example. Note that a speed that can detect any bit-size change is not necessary.

The SOA 12g amplifies an optical signal inputted from the photocoupler 12d through the optical delay line 12f under the control of the SOA controller 12h. Accordingly, the SOA 12g is an optical amplifier that executes an amplification operation on optical signals from the optical delay line 12f whereas execute a block operation of optical conduction on the second path p2, according to switching.

Specifically, the SOA controller 12h blocks an optical signal to the second interface 13 side by disabling the SOA 12g when no optical input is detected at the photodiode 12e. In contrast, the SOA controller 12h, when an optical input is detected at the photodiode 12e, conducts optical signals inputted through the optical delay line 12f by executing an ON control on the SOA 12g. The SOA 12g executes predetermined relay processing (optical amplification) for 10-G optical signals. Additionally, the SOA 12g may control the amplification ratio to make the output level constant in accordance with the optical input level (ALC control).

In other words, the SOA controller 12h is an amplifier controller that makes the SOA 12g to execute the amplification operation when the optical input is detected by the photodiode 12e while, when the optical input is not detected, making the SOA 12g execute the block operation irrespective of the amplification operation if a regeneration processing is executed by the regeneration processing section on the optical signal at the first transmission speed.

Note that the SOA controller 12h captures, from the photodiode 12e, an electric signal at level according to the input light intensity. The SOA controller 12h then detects presence or absence of an optical input with a threshold determination regarding the level of the electric signal. In this case, for stabilizing the control, the threshold for determining transition from the state where an optical input is present to the extinction state (the state where light is no more inputted) is set to be smaller than the threshold for determining the state where an optical input is present.

In addition, the optical delay line 12f provides a delay time such that ON control of the SOA 12g is completed before the start of an optical signal of which optical input is detected by the photodiode 12e. Furthermore, this delay time may be the time, from the start of a time slot, having a length sufficient to establish synchronization of a 1-G signal by the regenerator 12a, as described below. For the GE-PON, the length of the time of the Sync that is described above with reference to FIG. 3 is at least required for establishing synchronization of a time slot of a 1-G signal. The optical delay line 12f of the first embodiment provides a delay time of 1 µs that is longer than at least the time of the Sync.

That is, the above-described first interface 11 outputs signals having 1-G and 10-G optical signals to the regenerator 12a that is a component of the first processing section 12-1 and the SOA 23a that is a component of the second processing section 12-2. For this purpose, the collision between the output of the first processing section 12-1 that processes an optical signal for 1 G, and the output of the second processing section 12-2 that processes an optical signal for 10 G should be avoided.

For this purpose, the SOA controller 12h receives, from the regenerator 12a in the first processing section 12-1, a signal indicating that synchronization processing on a 1-G signal has been executed by the regenerator 12a. If synchronization processing on the 1-G signal has been executed by the regenerator 12a, since the time slot is allocated the 1-G optical signal, rather than a 10-G optical signal, the SOA 12g is forcefully controlled to be disabled irrespective of a detection of an optical input by the photodiode 12e. Thereby, it is possible to avoid collision of the outputs from the first processing section 12-1 and from the second processing section 12-2.

In contrast, in a time slot to which a 10-G optical signal is allocated, an optical signal that undergoes regeneration processing is not outputted to the second interface 13 since generator 12a cannot establish synchronization of a signal and the signal is not recognized as a signal. On the other hand, the optical signal is outputted to the second interface 13 since the second processing section 12-2 controls to enable the SOA 12g in response to a detection of the optical input.

Note that, upon transitioning from a time slot for 1 G to a time slot for 10 G, the SOA controller 12h receives, from the regenerator 12a, a signal notifying that synchronization of a 1-G signal is lost. The SOA controller 12h forcefully disables the OFF control of the SOA 12g in response to this signal notifying synchronization loss.

Thereby, the SOA controller 12h can execute ON control of the SOA 12g from the start of a 10-G time slot following a 1-G time slot. In other words, this prevents the forceful OFF control of the SOA 12g at the previous time slot from being taken over to the subsequent 10-G time slot.

In addition, the third processing section 12-3 executes, optical signals on the fourth path p4 having the downstream direction (second direction), processing corresponding to optical signals at 10-G that is the second transmission speed. That is, light at 1574-1580 nm (see FIG. 2b), which is the waveband of a 10-G optical signal, propagating through the fourth path p4 is inputted to the third processing section 12-3. The third processing section 12-3 adopts an optical amplifier having an optical amplification band thereof including the waveband of an optical signal inputted through the above-described fourth path p4, for example. For example, an SOA may be used.

FIG. 2c is a diagram illustrating the amplification waveband (C1) of the SOA 12g in the second processing section 12-2, and the amplification waveband (C2) of the SOA as the third processing section 12-3. The SOA 12g has an amplification waveband covering the waveband of a 10-G upstream optical signal (1260-1280 nm, see FIG. 2b). In contrast, the amplification waveband does not cover the entire band of the waveband of a 1-G upstream optical signal (1260-1360 nm, see FIG. 2a). This is the reason why processing by the regenerator 12a is executed on 1-G upstream optical signals, rather than relay processing by an optical amplification.

In addition, the SOA as the third processing, section 12-3 may include the band C2 covering the waveband for a 10-G downstream optical signal. It is noted that, as depicted in FIG. 2d, an erbium doped fiber amplifier (EDFA) that covers the waveband for a 10-G downstream optical signal as the amplification waveband may be used as the third processing section 12-3.

Thereby, by focusing on upstream signals, in a 1-G time slot, a 1-G optical signal that undergoes relay processing by the first processing section 12-1 is outputted to the optical transmission line 2 on the side of the OLT 3 through the second interface 13. Additionally, in a 10-G time slot, a 10-G optical signal that undergoes relay processing by the second processing section 12-2 is outputted to the optical transmission line 2 on the side of the OLT 3 through the second interface 13.

More specifically, even when parts of the wavebands of a plurality of upstream signals having different transmission speeds overlap, as in the case of the E-PON, the first and second processing sections 12-1 and 12-2 can execute appropriate relay processing in accordance with the transmission speeds.

Note that, when focusing on downstream signals, in the case of the E-PON, a downstream signal having a transmission speed of 1 G and a downstream signal having a transmission speed of 10 G have wavebands that are not overlapped with each other. Accordingly, an optical signal having different transmission speeds can be separated by separating 1-G and 10-G optical signals by their waveband and directing them to the separate optical paths p3 and p4, as in the second interface 13. A regenerator 12a and an SOA 12-3 provided in each of the optical paths p3 and p4 can execute relay processing for 1-G or 10-G optical signal.

As set forth previously, according to the first embodiment, in a network system in which optical signals having different transmission speeds coexist, such as a network system in which a 1-G and 10-G E-PON optical signals coexist, appropriate relay processing can be executed for the optical signals.

In addition, the embodiment has an advantage in that, when optical signals having different transmission speeds coexist, relay processing in accordance with the transmission speeds and transmission directions can be executed by a relay apparatus including the first and second interfaces 11 and 13 and the processing section 12. When OLTs and ONUs of a conventional PON are applied, the service range can be extended without modifying the conventional system, any construction of a new system is not required, thereby enabling cost reduction of the system as a whole.

(b) Second Embodiment

Figure 7:
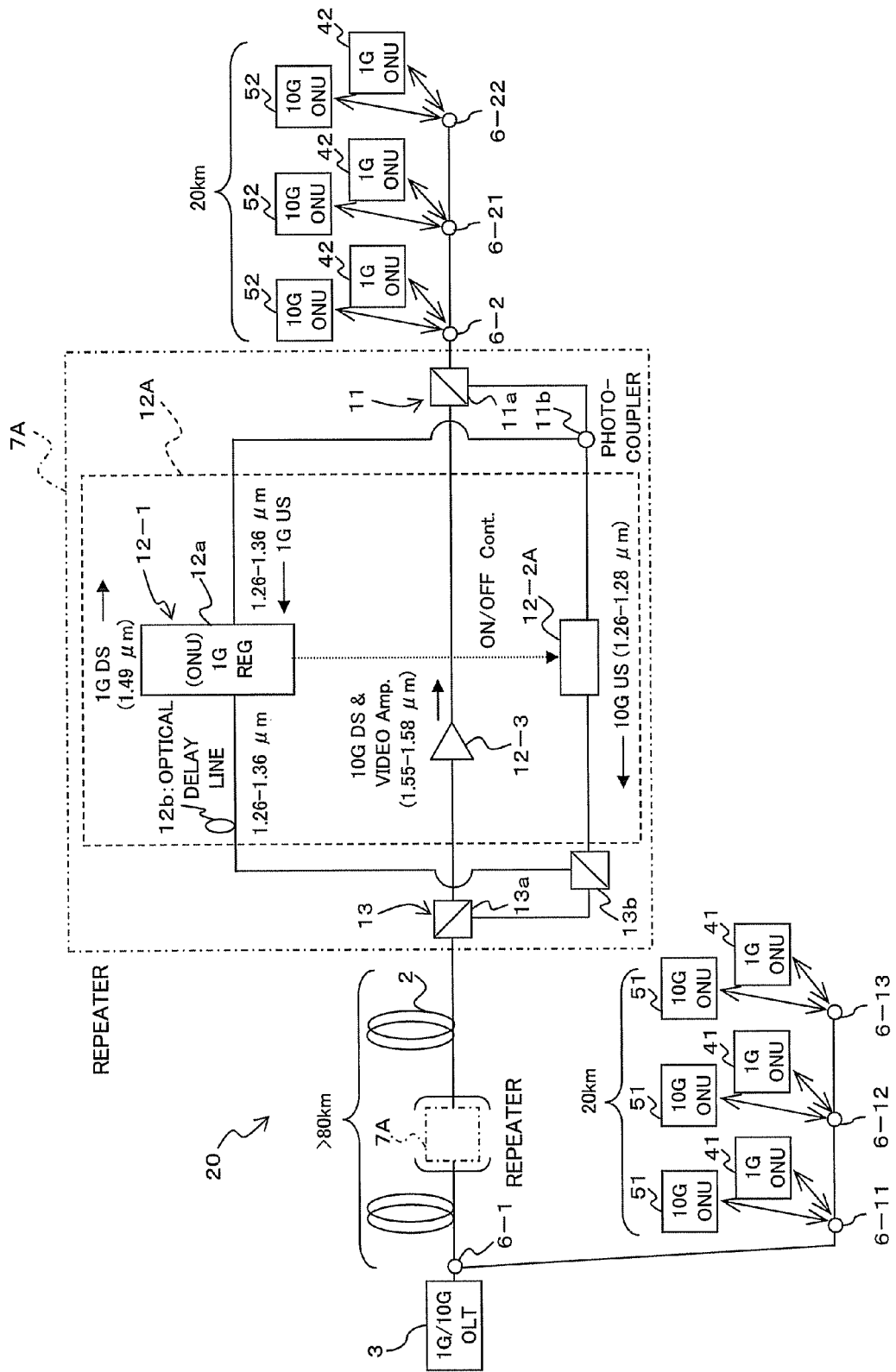
FIG. 7 is a diagram illustrating a repeater (relay apparatus) of a second embodiment.

FIG. 7 is a diagram illustrating a network system 20 in a second embodiment. Although the network system 20 depicted in FIG. 7 includes an OLT 3 and ONUs 4 and 5 that send and receive optical signals according to the 1-G and 10-G E-PONs, the network configuration thereof is different from that of the above-described embodiment depicted in the FIG. 1.

More specifically, a repeater 7A is interposed on an optical transmission line 2 in the network system 20, additional ONUs 4 and 5 are connected to the optical transmission line 2 bypassing the repeater 7A to an OLT 3.

Specifically, a splitter 6-1 is connected to an OLT 3 via the optical transmission line 2 bypassing the repeater 7A, and split the optical transmission line 2 into two, one of which is connected to the side of the optical transmission line 2 to which the repeater 7A is connected, and the other is connected to the ONUs 41 and 51 through the splitter 6-11 to 6-13.

In addition, the splitter 6-2 that is connected to the OLT 3 through the optical transmission line 2 via the repeater 7A splits the optical transmission line, which are connected to the ONUs 42 and 52 via splitters 6-21 to 6-22 that are connected in series. For example, although the ONUs 41 and 42 send and receive optical signals for the 1-G E-PON, they are different in terms of the transmission distances to the OLT 3 and presence of the repeater 7A to relay. Additionally, although the ONUs 51 and 52 send and receive optical signals for the 10-GE-PON, they are different in terms of the transmission distances to the OLT 3 and presence of the repeater 7A to relay.

Note that one repeater 7A is interposed on the optical transmission line 2 in FIG. 7, additional repeaters 7A may be interposed at locations, such as a location having a transmission section of 80 km or greater, for example, in order to assure the quality of optical signals sent and received between the OLT 3, and the ONUs 41, 42, 51, and 52.

Similar to the case of the first embodiment, the repeater 7A in the second embodiment also executes relay processing in accordance with the transmission speeds of optical signals when parts of the wavebands of a plurality of upstream signals having different transmission speeds, such as in the case of the E-PON.

The repeater 7A includes first and second interfaces 11 and 13, similar to the above-described first embodiment, the configuration of a processing section 12A is different. More specifically, the processing section 12A includes a first processing section 12-1 (12a, 12b) and a third processing section 12-3 that are similar to those depicted in FIG. 4, and further includes a second processing section 12-2A that is different from that depicted in FIG. 4. Note that like reference numerals depicted in FIG. 7 denote substantially similar elements depicted in FIG. 4.

Figure 8:
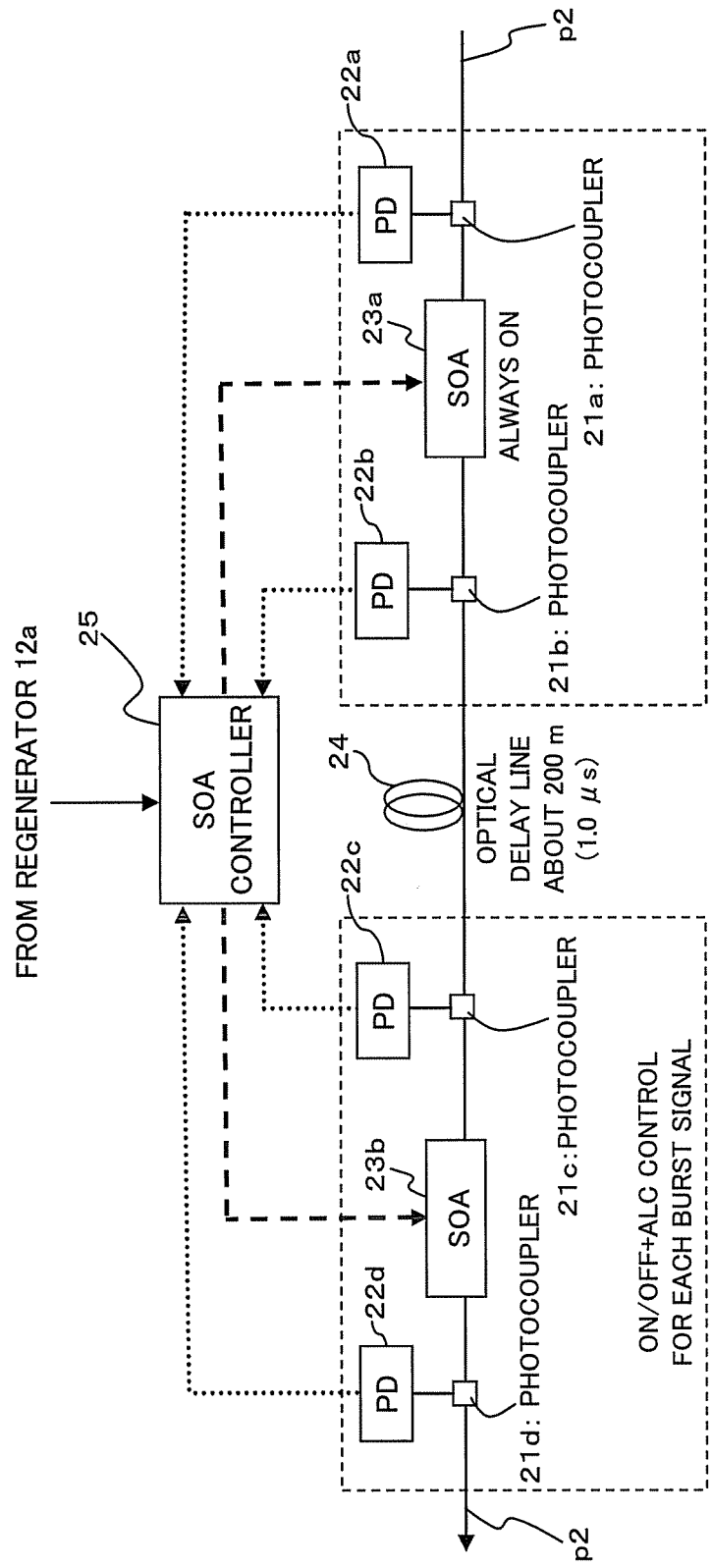
FIG. 8 is a diagram illustrating a second processing section in the second embodiment.

More specifically, the second processing section 12-2A includes photocouplers 21a-21d, photodiodes 22a-22d, SOAs 23a and 23b, an optical delay line 24 and, an SOA controller 25, as depicted in FIG. 8.

Each of the photocouplers 21a-21d splits an inputted optical signal propagating through the second path p2 (signal mixed with 1-G and 10-G optical signals), and directs one to the photodiodes 22a-22d and the other to the later stage of the first path p1. Here, the photocoupler 21a is provided on the input side of the SOA 23a, and the photocoupler 21b is provided on the output side of the SOA 23a. Similarly, the photocoupler 21c is provided on the input side of the SOA 23b, and the photocoupler 21d is provided on the output side of the SOA 23b.

Note that the SOA 23a and the photocouplers 21a and 21b and the photodiodes 22a and 22b on the output side thereof can be made as an integrated optical amplification module. Similarly, the SOA 23b and the photocouplers 21c and 21d and the photodiodes 22c and 22d on the output side thereof can be made as an integrated optical amplification module.

In addition, the photodiodes 22a-22d monitors the levels of optical signals from the corresponding photocouplers 21a-21d. The SOAs 23a and 23b amplify optical signals inputted from the photocouplers 21a and 21c, respectively, through the second path p2 under the control of the SOA controller 25.

Specifically, the SOA controller 25 always executes an ON control on the SOA 23a on the input side, irrespective of presence or absence of an optical input. In contrast, the SOA controller 25 blocks an optical signal to the second interface 13 side by executing an OFF control on the SOA 23b on the output side when no optical input is detected by the photodiode 22a (or 22b). The SOA controller 25, when an optical input is detected at the photodiode 22a (22b), conducts optical signals inputted through the optical delay line 24 and photocoupler 21c to the second interface 13 side by executing an ON control on the SOA 23b.

The SOA 23b executes predetermined relay processing (optical amplification) for 10-G optical signals. Note that the SOA controller 25 may be adapted to execute an automatic level control (ALC) on the amplification ratio of the SOA 23b in accordance with the monitor result from the photodiodes 22c and 22d, as illustrated in FIG. 9.

Note that the SOA controller 25 captures, from the photodiode 22a (22b), an electric signal at level according to the input light intensity. The SOA controller 25 then detects presence or absence of an optical input with a threshold determination regarding the level of the electric signal. In this case, for stabilizing the control, the threshold for determining transition from the state where an optical input is present to the extinction state (the state where light is no more inputted) is set to be smaller than the threshold for determining the state where an optical input is present.

In addition, the optical delay line 24 provides a delay time such that ON control of the SOA 23b by the SOA controller 25 is completed before the start of an optical signal of which optical input is detected by the photodiode 22a (22b). The delay time is set based on response times of, the photodiode 22a (22b), the SOA controller 25, and the SOA 23b, or the like.

Figure 9:
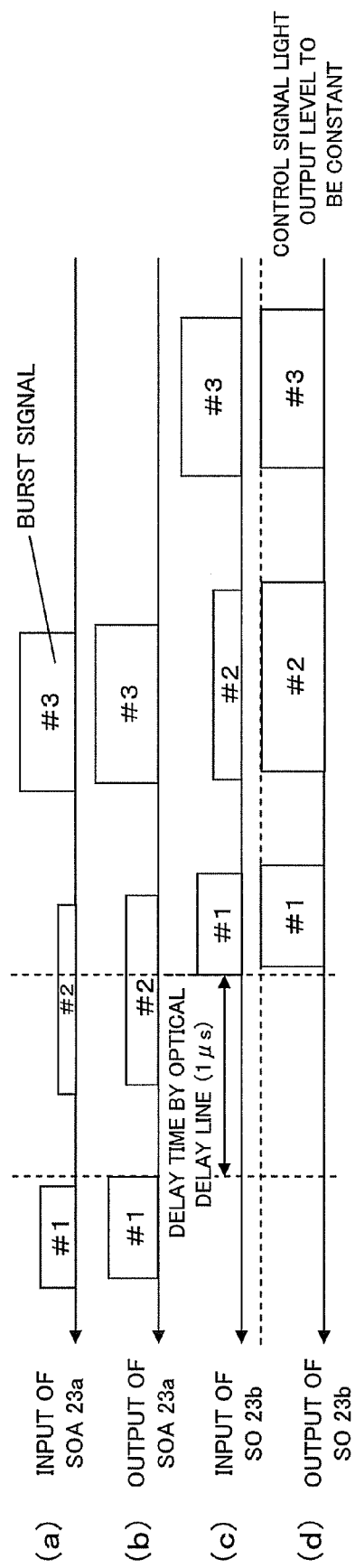
FIGS. 9a-9d are diagrams illustrating an ALC control by the second processing section.

FIG. 9 is a diagram illustrating the above-described ALC control on the SOA 23b by the SOA controller 25. In time slots allocated to the downstream side ONUs 42 and 52, respectively, an optical signal directed to the OLT 3 is inputted to the repeater 7A, as a burst optical signal.

For example, as depicted in FIG. 9a, burst optical signals #1-#3 from the ONUs 42 and 52 are inputted to the SOA 23a through the first interface 11. It is noted that the burst optical signals #1-#3 in the drawing may be optical signals from different ONUs 42 and 52 at continuous time slots.

The SOA 23a, which always undergoes ON control during operation, amplifies an input optical signal at a constant gain. For example, since it can be assumed that the power of a 10-G optical signal is relatively susceptible to the influence of the transmission distance, the levels of the input optical signals may experience variations due to the sending ONU 52, as in the burst optical signals #1-#3. Since the SOA 23a performs amplification at a constant gain, it executes amplification at the levels including such variations as illustrated in FIG. 9b.

The SOA 23b then executes an ALC control for an optical signal that is outputted from the SOA 23a and provided a delay of 1 µs by the optical delay line 24. A PD 22a (or 22b) has a response speed that can detect an optical signal level inputted as a burst signal. The SOA controller 25 then controls the gain of the SOA 23b in accordance with the optical signal level detected by the PD 22a (22b).

Since the above-described gain control of the SOA 23b by the SOA controller 25 is executed in accordance with the level of an optical signal at the previous stage inputted to the optical delay line 24, such an optical signal can be received after the environment of the SOA 23b for the gain control is well established. It is noted that the delay time at the optical delay line 24 may be set in the manner similar to the optical delay line 12f in the first embodiment.

For example, as depicted in FIG. 9b, since optical signals #1-#3 that are burst signals are inputted to the SOA 23b, on which gain control is executed, after being delayed by the optical delay line 24 (FIG. 9c), the SOA 23b can output burst optical signals #1-#3 at a constant level (FIG. 9d).

In addition, the above-described first interface 11 outputs signals having 1-G and 10-G optical signals to the regenerator 12a that is a component of the first processing section 12-1 and the SOA 23a that is a component of the second processing section 12-2. For this purpose, the collision between the output of the first processing section 12-1 that processes an optical signal for 1 G, and the output of the second processing section 12-2 that processes an optical signal for 10 G should be avoided.

For this purpose, the SOA controller 25 receives, from the regenerator 12a in the first processing section 25-1, a signal indicating that synchronization processing on a 1-G signal has been executed by the regenerator 12a. Since the time slot is allocated to a 1-G optical signal, rather than a 10-G optical signal when 1-G signal synchronization processing is executed by the regenerator 12a, the SOA controller 25 forcefully executes an OFF control (block control) on the SOA 23b (t3-t6 in FIG. 10).

Figure 10:
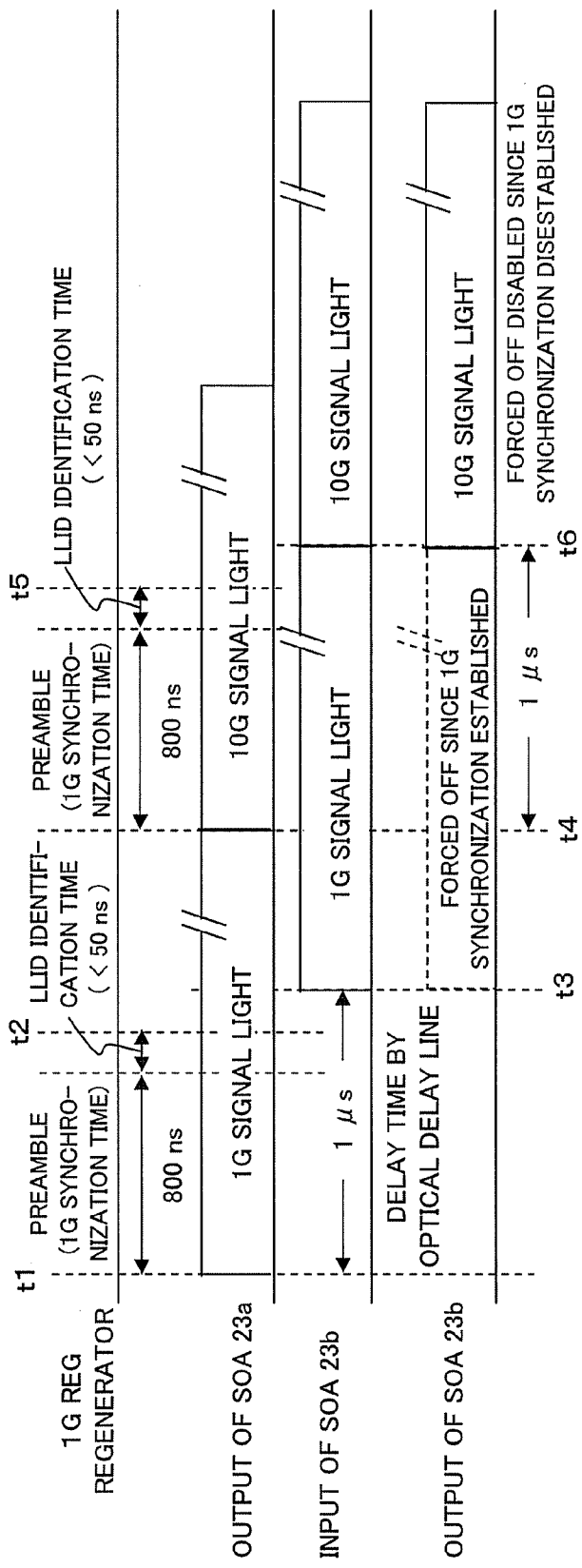
FIG. 10 is a diagram illustrating switching between conduction or block by the second processing section.

For establishing synchronization of time slots for 1 G in the regenerator 12a, at least about 850 ns (i.e., time of Sync+ identification time of LLID is required, as depicted in FIG. 3 (points in time t1-t2 in FIG. 10). The optical delay line 24 delays an optical signal in the time slot for 1 G outputted from the SOA 23a. More specifically, the optical delay line 24 delays with sufficient delay time (1 µs in this case) such that the signal when synchronization of a corresponding 1-G optical signal is established by the regenerator 12a is received, and an OFF control is executed on the SOA 23b before that 1-G optical signal is inputted to the SOA 23b (point in times t1-t3, and following points in times t4-t6 in time slots in FIG. 10).

In addition, if the established synchronization by the regenerator 12a is lost, as in the case of transitioning from a 1-G time slot to a 10-G time slot, the SOA controller 25 receives a signal notifying the loss of synchronization of the 1-G signal from the regenerator 12a. The SOA controller 25 disables the forceful OFF control on the SOA 23b in response to the signal notifying the synchronization loss, and executes ON control of the SOA 12g from the start of a 10-G time slot following the 1-G time slot (conduction control). In other words, this prevents the forceful OFF control of the SOA 23b at the previous time slot from being taken over to the 10-G time slot.

That is, in a time slot to which a 10-G optical signal is allocated, an optical signal that undergoes regeneration processing is not outputted to the second interface 13 since generator 12a cannot establish synchronization of a signal and the signal is not recognized as a signal. On the other hand, the second processing section 12-2A can output an optical signal that undergoes the ALC control to the second interface 13 since the SOA controller 25 disables the above-described forced OFF control in response to a signal from the regenerator 12a notifying a synchronization loss.

Accordingly, the advantages the same as in the case of the first embodiment described above can be obtained according to the second embodiment.

(C) Others

Without being limited to the above-identified embodiments, the present disclosure may be implemented various manner without departing from the spirit thereof.

For example, although a network system have been described through which 1-G and 10-G E-PON optical signals are propagated, as optical signals having different transmission speeds, optical signals having other transmission speeds may be combined or other optical signals, for the G-PON for example, may be used.

In addition, in the above-described second embodiment, a filter that has a property similar to that of the above-described third transmission/reflection filter 13b are interposed between the SOA 23a and the SOA 23b and that transmits the waveband of 10-G upstream optical signals. This can further reduce ASE components contained in 10-G upstream optical signals outputted through the second interface 13.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) has (have) been described in detail, it should be understood that the various changes, substitutions, and alterations could be made hereto without departing from the spirit and scope of the invention.

What is claimed is:

1. A relay apparatus interposed in an optical transmission line through which different types of optical signals are transmitted in two opposite directions, the optical signals having different transmission speeds for each direction, the relay apparatus comprising:
    a first interface that branches an optical signal that is input in a first direction from one side of the optical transmission line, splits the optical signal in the first direction into optical signals on first and second paths and directs the optical signal to the first path and the second path, the first path being a processing path of an optical signal having a first transmission speed, the second path being a processing path of an optical signal having a second transmission speed that is different from the first transmission speed; a processing section that executes processing on an optical signal in the first direction propagating through each of the paths in accordance with a corresponding transmission speed, including a first processing section that executes processing corresponding to the optical signal at the first transmission speed on the optical signal on the first path in the first direction, including a regeneration processing section that executes regeneration processing on the optical signal at the first transmission speed by way of electric stage processing and a first delay section that delays the optical signal on the first path; and a second processing section that executes processing corresponding to the optical signal at the second transmission speed on the optical signal on the second path in the first direction; and
    a second interface that binds the first path and the second path, which are propagation paths of the optical signal on which the processing is executed by the processing section, by means of wavelength multiplexing and directs to the other end of the optical transmission line, wherein in an optical signal in the first direction, a waveband of the optical signal at the second transmission speed overlaps entirely or in part with a waveband of the optical signal at the first transmission speed.

2. The relay apparatus according to claim 1, wherein the second processing section conducts or blocks an output of a result of the processing in response to presence or absence of an input of an optical signal to the second processing section, and blocks the output of the result of the processing irrespective of presence or absence of an input of the optical signal when processing corresponding to the optical signal at the first transmission speed is executed by the first processing section.

3. The relay apparatus according to claim 1, wherein, in an optical signal in a second direction that is opposite to the first direction, a waveband of the optical signal at the first transmission speed and a waveband of the optical signal at the second transmission speed do not overlap each other.

4. An optical communication system, comprising:
    the relay apparatus according to claim 1 interposed in an optical transmission line.

5. A relay apparatus interposed in an optical transmission line through which different types of optical signals are transmitted in two opposite directions, the optical signals having different transmission speeds for each direction, the relay apparatus comprising:
    a first interface that branches an optical signal that is input in a first direction from one side of the optical transmission line, splits the optical signal in the first direction into optical signals on first and second paths and directs the optical signal to the first path and the second path, the first path being a processing path of an optical signal having a first transmission speed, the second path being a processing path of an optical signal having a second transmission speed that is different from the first transmission speed; a processing section that executes processing on an optical signal in the first direction propagating through each of the paths in accordance with a corresponding transmission speed, including a first processing section that executes processing corresponding to the optical signal at the first transmission speed on the optical signal on the first path in the first direction; and a second processing section that executes processing corresponding to the optical signal at the second transmission speed on the optical signal on the second path in the first direction, including:
    a splitter that further splits the optical signal in the first direction;
    a detector that is provided on one of paths split by the splitter and detects an optical input;
    a second delay section that delays another path of the paths split by the splitter;
    an optical amplifier that executes, in accordance with a switching, an amplification operation on an optical signal from the second delay section, or a block operation of optical conduction on the second path; and
    an amplifier controller that controls the switching of the optical amplifier, and makes the optical amplifier execute the amplification operation when the optical input is detected by the detector while, when the optical input is not detected, making the optical amplifier execute the block operation irrespective of the amplification operation if a regeneration processing is executed by the regeneration processing section on the optical signal at the first transmission speed; and
    a second interface that binds the first path and the second path, which are propagation paths of the optical signal on which the processing is executed by the processing section, by means of wavelength multiplexing and directs to the other end of the optical transmission line, wherein in an optical signal in the first direction, a waveband of the optical signal at the second transmission speed overlaps entirely or in part with a waveband of the optical signal at the first transmission speed.

6. The relay apparatus according to claim 5, wherein the optical amplifier is a semiconductor optical amplifier.

7. A relay apparatus interposed in an optical transmission line through which different types of optical signals are transmitted in two opposite directions, the optical signals having different transmission speeds for each direction, the relay apparatus comprising:
a first interface that branches an optical signal that is input in a first direction from one side of the optical transmission line, splits the optical signal in the first direction into optical signals on first and second paths and directs the optical signal to the first path and the second path, the first path being a processing path of an optical signal having a first transmission speed, the second path being a processing path of an optical signal having a second transmission speed that is different from the first transmission speed; a processing section that executes processing on an optical signal in the first direction propagating through each of the paths in accordance with a corresponding transmission speed, including a first processing section that executes processing corresponding to the optical signal at the first transmission speed on the optical signal on the first path in the first direction; and a second processing section that executes processing corresponding to the optical signal at the second transmission speed on the optical signal on the second path in the first direction; and
a second interface that binds the first path and the second path, which are propagation paths of the optical signal on which the processing is executed by the processing section, by means of wavelength multiplexing and directs to the other end of the optical transmission line, wherein in an optical signal in the first direction, a waveband of the optical signal at the second transmission speed overlaps entirely or in part with a waveband of the optical signal at the first transmission speed and directs, an optical signal that is input from the optical transmission line having a second direction that is opposite to the first direction, to a third path that is a processing path for the optical signal at the first transmission speed and a fourth path that is a processing path for the optical signal at the second transmission speed, wherein
the processing section executes processing on an optical signal in the second direction propagating through each of the paths in accordance with a corresponding transmission speed, the first interface binds the third path and the fourth path that are paths of the optical signal in the second direction to which the processing is executed by the processing section, and directs to the optical transmission line, and
the relay apparatus relays an optical signal in a second direction that is opposite to the first direction.

8. The relay apparatus according to claim 7, wherein the first and third paths are shared paths,
the first processing section executes processing corresponding to the optical signal at the first transmission speed on an optical signal on the shared first and third paths,
the processing section further comprises a third processing section that executes processing corresponding to the optical signal at the second transmission speed on an optical signal on the fourth path in accordance with the optical signal at the second transmission speed.

9. The relay apparatus according to claim 7, wherein the first interface comprises:
a first transmission/reflection filter in which the transmission line and the fourth path are connected in a transmission route, and the transmission line and the shared first or third path and the second path are connected in a reflection route; and
a photocoupler that couples and branches between the shared first or third path and the second path, and the reflection route in the transmission/reflection filter,
the second interface comprises:
a second transmission/reflection filter in which the transmission line and the fourth path are connected in a transmission route; and
a third transmission/reflection filter that is connected in a reflection route for the optical transmission line of the second transmission/reflection filter, the second transmission/reflection filter and the shared first and third paths being connected via a reflection route, the second transmission/reflection filter and the second path being connected via a transmission route.

10. The relay apparatus according to claim 9, wherein, in the optical signal in the first direction, a waveband of the optical signal at the second transmission speed overlaps entirely or in part with a waveband of the optical signal at the first transmission speed,
in an optical signal in a second direction that is opposite to the first direction, a waveband of the optical signal at the first transmission speed and a waveband of the optical signal at the second transmission speed do not overlap each other, and do not overlap with a waveband of the optical signal in the first direction,
the first transmission/reflection filter and the second transmission/reflection filter are set such that a transmission waveband is a waveband of the optical signal in the second direction at the second transmission speed, and others are set to a reflection waveband, and
the third transmission/reflection filter is set such that a transmission waveband is a waveband of the optical signal in the first direction at the second transmission speed, and others are set to a reflection waveband.

11. The relay apparatus according to claim 10, wherein the first processing section executes a wavelength conversion such that all wavelength band components of the optical signal in the first direction at the first transmission speed are reflected by the third transmission/reflection filter.

12. A signal processing apparatus that processes optical signals including an optical signal at a first transmission speed and an optical signal at a second transmission speed, different from the first transmission speed, coexisting on a time axis, comprising:
a first interface that branches the optical signal input in a first direction from one side of an optical transmission line and splits the optical signal in the first direction into branched signals on a first path processed at the first transmission speed and a second path processed at the second transmission speed;
a first processing section that executes processing corresponding to the optical signal at the first transmission speed on one of branched signals of the coexisting optical signals, including a regeneration processing section that executes regeneration processing on the optical signal at the first transmission speed by way of electric stage processing and a first delay section that delays the optical signal on the first path;
a second processing section that executes processing corresponding to the optical signal at the second transmission speed on another of the branched signals of the coexisting optical signals in accordance with the optical signal at the second transmission speed on the second path, wherein the second processing section outputs a result of the processing when an input of another of the branched signals is detected while stopping the output of the result of the processing when the input is not detected, and preferentially stops the output of the result of the processing when processing corresponding to the optical signal at the first transmission speed is executed by the first processing section, and in an optical signal in the first direction, a waveband of the optical signal at the second transmission speed overlaps entirely or in part with a waveband of the optical signal at the first transmission speed.

* * * * *